Aug. 17, 1954 R. E. EVANS ET AL 2,686,822
CONSUMABLE ELECTRODE FURNACE AND
METHOD FOR PRODUCING TITANIUM
Filed Sept. 12, 1950 2 Sheets-Sheet 2

INVENTORS
RICHARD E. EVANS
PAUL F. DARBY
JOHN P. CATLIN
BY
ATTORNEYS

Patented Aug. 17, 1954

2,686,822

UNITED STATES PATENT OFFICE 2,686,822

CONSUMABLE ELECTRODE FURNACE AND METHOD FOR PRODUCING TITANIUM

Richard E. Evans, Southport, Paul F. Darby, Fairfield, and John P. Catlin, Bridgeport, Conn., assignors to Rem-Cru Titanium, Inc., Midland, Pa., a corporation of Pennsylvania Application September 12, 1950, Serial No. 184,374

11 Claims. (Cl. 13—9)

This invention relates to the melting of refractory metals and contemplates apparatus for and a method of arc melting, in which the material to be melted is fed to the arc in the form of a sintered stick, the arc from a permanent electrode passing both to the sintered stick and to a pool of molten metal. The invention will be described with particular reference to the production of ingots of titanium and its alloys, but it is to be understood that it is also applicable to the melting of other refractory and reactive metals, such as beryllium, columbium, molybdenum, tantalum, tungsten, uranium, and zirconium.

One of the objects of the present invention is to provide a novel method for producing titanium and its alloys in an electric furnace employing an electrical arc wherein substantially more efficient use of electrical power is made.

A further object of the invention is to provide such a novel method wherein the speed of the melting of the metal is increased substantially without the hazard of an electrical arc striking the mold or furnace walls so as to damage them. Another object is to provide novel method and apparatus of this character wherein the material to be melted is subjected to an appreciable preheating which aids in purging such material of volatile substances.

Figure 1:
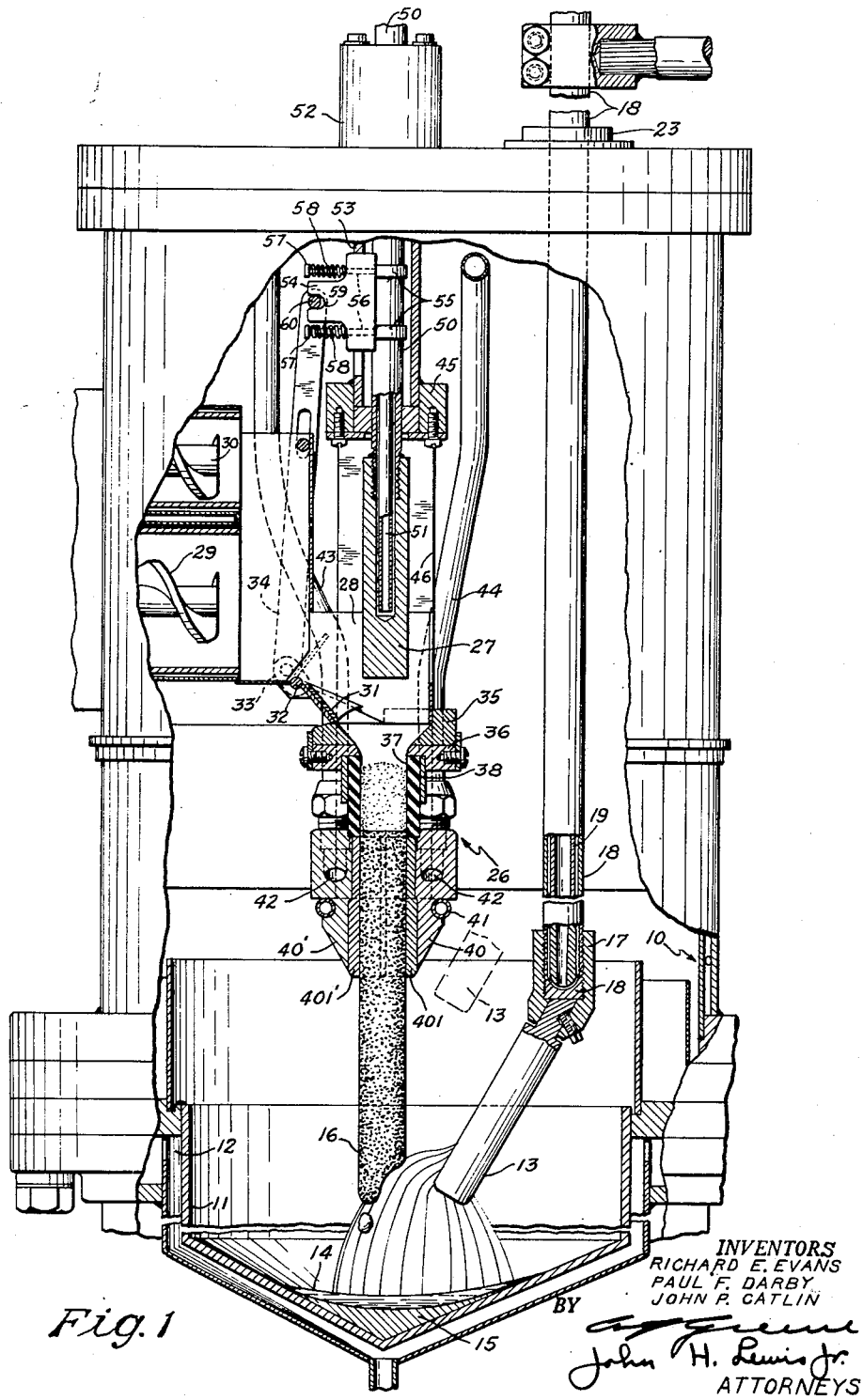
Fig. 1 is an elevation partly in section of a furnace adapted for the practice of the invention.

The metal titanium has a relatively high melting point and in the molten state it has a great affinity for most other substances including atmospheric gases and all known crucible or mold materials. For these reasons, a furnace for the melting of titanium must be substantially gastight and filled with an inert gas such as argon. Moreover, the crucible or mold in which melting is performed must be so constructed that it will not be destroyed by contact with molten titanium or appreciably contaminate the melt.

The production of ingots of titanium alloys is frequently further complicated by the difference between the melting point of titanium and the melting point of the alloying ingredient. Due to the high melting point of titanium, an electric arc has been found the most satisfactory source of melting heat. Practice prior to the present invention has been to feed granular or pulverulent titanium into a water-cooled copper mold and to strike an arc between a permanent electrode and the mold and melt contained therein. When titanium was to be alloyed with other metals, an admixture of comminuted titanium and the desired proportion of the alloying ingredient or ingredients was similarly introduced into the mold. The melt solidifies immediately upon contact with the cold mold but the heat of the arc maintains a pool of molten metal at the top of the ingot and the electrode is withdrawn or lifted as the ingot is built up by the melting of the comminuted metal or admixture fed into the molten pool. This method has certain limitations and disadvantages.

In the operation of a melting furnace in which the ingot is built up by the more or less regular addition of powdered or granulated material to a molten pool maintained by an electric arc passing from an inert cathode to the pool, difficulty is experienced in the production of sound homogeneous ingots, particularly near the outer surface of the ingot. This difficulty stems from the fact that contact of the outer surface with the relatively cold mold walls results in a temperature gradient such that the temperature of the pool close to and adjacent to the walls is only slightly above or at the melting point of the metal. Under these conditions, the addition of cold unmelted material is likely to freeze the pool for an appreciable distance in from the mold walls. If this unassimilated material is not completely remelted, it results in a defect or discontinuity which may necessitate scrapping a considerable part of the ingot.

A further difficulty arises from the presence of foreign matter in the metal to be melted. Titanium sponge contains small amounts of volatile materials such as magnesium and magnesium chloride. When such sponge is dropped into a molten pool of titanium, the sudden volatilization of the foreign materials spatters molten metal about. Some of this projected molten metal lands on the electrode, dissolves electrode material, and then drips back into the melt with both loss of electrode material and contamination of the melt.

Again, the melting and remelting of metal in a pool in the top of an ingot which is in heat conductive contact with a cold mold entails a material loss of heat and heat supplying power. Relatively cold solid metal dropped into the molten pool is immediately surrounded with a sheath of metal solidified from the melt so that it is necessary not only to melt the added metal but to remelt previously melted metal which has congealed therein, all while heat is being rapidly transferred to the mold.

The present invention contemplates compacting and sintering the granular materials to be melted into a solid stick which forms an electrode of the melting arc there being in addition a separate but permanent electrode. By so doing, the material at the arc forming end of said stick is melted therefrom, drop by drop, and falls into the pool of melt in a molten condition. Contaminants which are gasified by the melting heat escape from the surface of the stick without spatter. The arc which extends from the permanent electrode to both the consumable electrode and the melt may be so regulated as to maintain a molten pool which extends very close to the mold wall, thereby reducing the temperature gradient from the surface to the interior of the melt and the upper portion of the ingot. The consumable electrode is thermally insulated and melting is effected in the intense heat of the arc instead of in the cooler massive and heat conductive ingot pool with its heat conductive contact with the mold, thereby effecting a material saving of power. The heat of the arc is sufficient to liquefy high melting alloying ingredients such as molybdenum, which cannot be adequately melted and evenly distributed and alloyed in the lower temperature of the molten pool.

Referring to the drawings, numeral 10 identifies the body of the furnace which, as shown, is preferably of double-walled construction. All permanently joined parts are welded gas-tight and all attachments and openings are provided with gas-tight seals. In the lower part of the furnace is a crucible or mold 11 of a heat conductive metal such as copper, said mold being surrounded by a water jacket 12. A permanent electrode 13 projects into and toward the center of the mold in such position as to form an arc with pool 14 of the molten metal or alloy therein. Upon contact with the cold copper crucible, the molten metal quickly congeals into a solid ingot 15. As the ingot builds up in the mold, electrode 13 is lifted or withdrawn, to maintain proper spacing from the pool 14.

The granular or pulverized titanium or admixture of titanium with one or more alloying ingredients is fed into the arc in the form of a sintered stick or consumable electrode 16 which is electrically biased with reference to electrode 13 in the same sense as mold 11, so that the arc from electrode 13 passes not only to the melt 14 but also to the stick 16. By way of example, the potential between permanent electrode 13 and melt 14 may be about 40 volts, and that between permanent electrode 13 and consumable electrode 16 may be about 60 volts. Thus, the material of stick 16 is melted and falls drop-wise in molten state into the pool 14, as distinguished from being dropped and spread over the surface of pool 14 while in a solid state.

Electrode 13 is secured by means of a connector 17 to an electrode holder 18, which extends upwardly through the furnace and projects from the top thereof. The holder is of tubular construction and contains a water tube 19 which terminates near the lower end of the holder. Suitable water connections are provided for circulating water through tube 19 and the annular passage surrounding this tube. The electrode holder extends upward through a suitable gas sealing and insulating bushing 23 in the top of the furnace and is connected to a suitable lifting and lowering device, not shown, since per se it is not part of the present invention.

Figure 5:
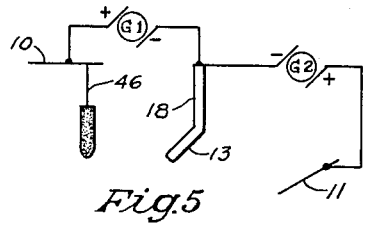
Fig. 5 is a wiring diagram for the direct current arc circuit.

One arrangement for applying to consumable electrode 16 and permanent electrode 13, respectively, the potentials requisite to secure the results desired is indicated in Fig. 5. The positive terminal of a direct current generator G-1 is grounded to the furnace wall 10 which, through support 46 and holder 40 (to be described), is electrically connected to consumable electrode 16. Both the negative terminal of generator G-1 and the negative terminal of a second generator G-2 are connected to the holder 18 of the permanent electrode 13, and the positive terminal of generator G-2 is connected to the crucible or mold 11, which mold is insulated from furnace wall 10. The current through permanent electrode 13 may be several thousand amperes, and the current through consumable electrode 16 may be a few hundred amperes.

The stick or consumable electrode 16 of the material to be melted is formed and sintered from granular or pulverized ingredients in a tubular unit identified generally by numeral 26 by means of a compacting and sintering punch 27. The comminuted metals are delivered to unit 26 through a feed box 28 to which they are supplied by suitable means, such as one or more screws 29 and 30, which screws effect the transfer of the materials from suitable hoppers (not shown). For the purpose of illustration, it may be considered that screw 29 delivers granular titanium and screw 30 delivers an alloying ingredient, such as aluminum, manganese, or an admixture thereof. The feed box 28 comprises a passage adapted to be intermittently partially closed by a trap door 31 pivoted at 32 and actuated by means of a crank 33 and link 34, the link being reciprocated in synchronism with punch 27 by means to be hereinafter described. The tubular sintering and compacting unit 26 comprises an upwardly and outwardly flared throat portion 35 which is of a rugged electrically insulating material and is fitted to the outlet of feed box 28. The throat 35 is supported on an insulated ring-shaped member 36, which is recessed to receive the upper end of a hollow cylinder 37 of electrically insulating material, preferably ceramic, said cylinder 37 being partly surrounded and guided by a sleeve 38. The lower end of cylinder 37 is received in a recess in the upper end of a body member of an electrically conductive metal such as copper. Said body comprises two counterpart halves 40 and 40', and will, for convenience, be hereinafter referred to as the stick or consumable electrode holder 40. Elements 40 and 40' contain bushings or liners 401 and 401' which are of more abrasion-resistant metal than the highly electrically conductive metal of the elements themselves. Said elements are pressed into juxtaposition by a suitable spring device such as garter spring 41, and are interiorly shaped to form a continuation of the passage through cylinder 37. Each is provided with a passage 42 for cooling water which is supplied and returns through suitable tubular connections indicated at 43 and 44. The unit 26 is supported and held in assembly by plates 46 secured to and extending upwardly from members 40 and 40' and ring 36, respectively, and fastened to a support 45. In operation, an alternating current voltage is applied between punch 27 and electrode holder 40 during the major portion of the downward stroke of the punch, and current flows between the punch and the holder through the mass of loose material contained in cylinder 37. A suitable mechanical resistance to the movement of the stick or electrode 16 through holder 40 is supplied by spring 41.

Punch 27 is carried by a hollow punch holder 50 containing a water tube 51. Punch holder 50 is guided for its vertical reciprocating movement in a suitable electrically insulating and gas-tight packing 52 associated with the furnace cover, and in the guide and supporting member 45, which is supported from the furnace cover by suitable means such as plates 53. The feed box trap door operating link 34 is actuated from punch holder 50 by a suitable lost motion connection which may comprise a fibre block 54 having a surface contact with the periphery of punch holder 50, and is held thereon by suitable means, such as rings 55 surrounding the punch holder and secured to threaded posts 56 which pass through apertures in block 54 and provided with abutments 57 for springs 58 compressed between the abutments and appropriately disposed surfaces of block 54. Said block 54 is provided with a cut-out 59 which receives a stud 60 on link 34.

Figure 2:
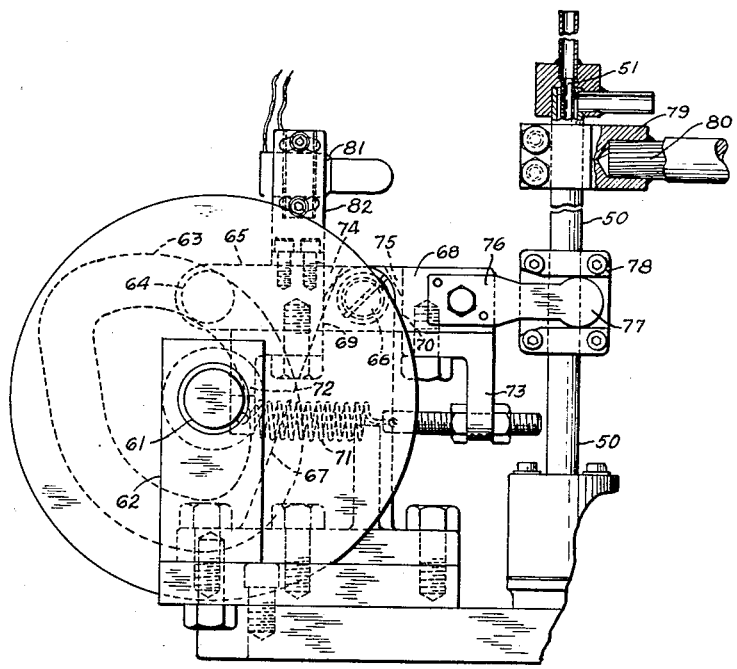
Fig. 2 is an elevation of mechanism mounted on the cover of the furnace and having the function of controlling the operation of a compacting and sintering punch.

The means for reciprocating and intermittently electrically energizing the punch holder 50 is illustrated in Fig. 2. A horizontally disposed shaft 61 carried in brackets 62 secured to the furnace cover and driven by suitable means (not shown) carries a box cam 63 which receives a cam follower 64 carried by a lever 65 pivoted at 66 in bracket 67. A second lever 68, likewise pivoted at 66, is normally moved with and by lever 65 through the abutting faces 69 and 70 of said levers and a spring 71 which is connected to the two levers respectively through brackets 72 and 73. Cut-outs 74 and 75 on the two levers provide for lost motion whenever the stress on lever 68 is sufficient to displace the adjustably tensioned spring 71. Secured to lever 68 is a fork member 76 provided with circular heads 77 received in slots in a block 78 secured to punch holder 50. Another block 79 also secured to punch holder 50 receives a current carrying cable 80, and at the upper end of the punch holder are suitable connections for the supply and escape of water to and from tube 51 and the passage surrounding this tube. The supply of current to cable 80 is controlled in part by a mercury switch 81 held in a post 82 secured to lever 65, the arrangement being such that the switch is closed as the punch approaches its uppermost position.

Figure 4:
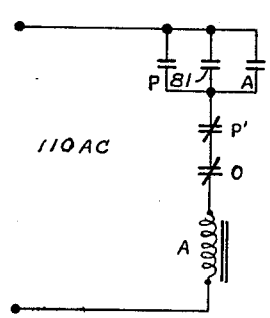
Fig. 4 shows a control for the power circuit of Fig. 3.
Figure 3:
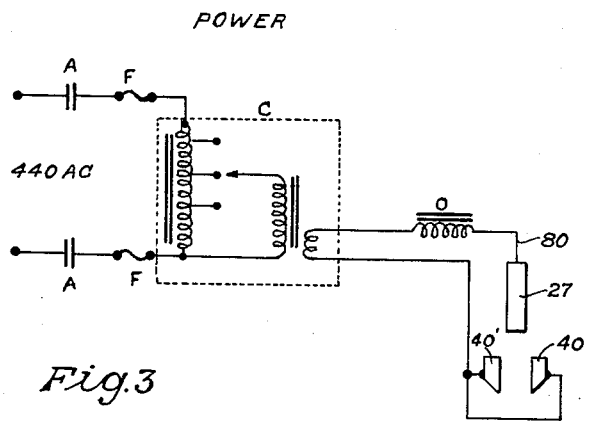
Fig. 3 is a wiring diagram of an alternating current circuit used for sintering comminuted material into a consumable electrode.

Fig. 4 is a conventionalized wiring diagram for the control of the means for electrically energizing and de-energizing punch 27 at the proper time. The mercury switch 81 is in series with an overload switch O and a relay coil A, and in parallel with relay switch A. Relay coil A likewise controls a switch in a 440 volt power circuit which feeds the primary of transformer C as shown in Fig. 3. The secondary of transformer C, which delivers about 8 volts, comprises overload relay O, cable 80, punch 27, and electrode holder 40. Mercury switch 81 is closed during the upward movement of punch 27, energizing the primary of transformer C which, by reason of relay switch A in the control circuit, remains energized after mercury switch 81 has been open in the descending movement of the punch. As the punch descends it makes contact with the loose material in tube 37 and the sintering current begins to flow from punch 27 to holder 40. As compacting and sintering proceeds, the resistance between punch 27 and holder 40 diminishes and current flow increases to a value for which the overload relay O is adjusted, for example, about 1000 amperes. Energization of the overload relay O opens the normally closed switch O in the control circuit, de-energizing relay A and opening the power circuit. The punch 27 is thus de-energized, and in its remaining downward movement merely pushes the sintered stick downwardly through the holder and into the arc.

It will be understood that the embodiment of the invention herein described is illustrative only and that the apparatus is susceptible to numerous variations.

What is claimed is:

1. Apparatus for the melt casting of titanium and its alloys comprising a mold for containing a melt of such material, a permanent electrode projecting into said mold, a consumable electrode of such metal to be cast projecting into said mold, means for maintaining an arc between said permanent electrode and said consumable electrode and an arc between said permanent electrode and the melt in said mold, means for feeding said consumable electrode as it is consumed, and means for forming said consumable electrode from pulverulent material as it is fed.

2. Apparatus for the melt casting of titanium and its alloys comprising a mold for containing a melt of such material, a permanent electrode projecting into said mold, a consumable electrode of such substance to be cast projecting into said mold, means for maintaining an arc between said permanent electrode and said consumable electrode and an arc between said permanent electrode and the melt in said mold, means for forming said consumable electrode from pulverulent material and feeding the electrode thus formed comprising a tubular holder, means for delivering successive increments of electrode forming material to said holder, and means comprising a reciprocating punch actuated in synchronism with said material delivery means for compacting successive increments of electrode forming material delivered to said holder by said material delivery means.

3. Apparatus for the melt casting of titanium and its alloys comprising a mold for containing a melt of such material, a permanent electrode projecting into said mold, a consumable electrode of such metal to be cast projecting into said mold, means for maintaining an arc between said permanent electrode and said consumable electrode and an arc between said permanent electrode and the melt in said mold, means for forming said consumable electrode from pulverulent material and feeding the electrode thus formed comprising a tubular holder, means for delivering successive increments of electrode forming material to said holder, means comprising a reciprocating punch actuated in synchronism with said material delivery means for compacting successive increments of electrode forming material delivered to said holder by said material delivery means, and means for partially sintering said material while under the pressure of said punch.

4. Apparatus for the melt casting of titanium and its alloys comprising a mold for containing a melt of such material, a permanent electrode projecting into said mold, a consumable electrode of such metal to be cast projecting into said mold, means for maintaining an arc between said permanent electrode and said consumable electrode and an arc between said permanent electrode and the melt in said mold, means for forming said consumable electrode from pulverulent material and feeding the electrode thus formed comprising a tubular holder, means for delivering successive increments of electrode forming material to said holder, means comprising a reciprocating punch actuated in synchronism with said material delivery means for compacting successive increments of electrode forming material delivered to said holder by said material delivery means, and means for partially sintering said material while under the pressure of said punch, said sintering means comprising means for passing an electric current through said punch, said material and said consumable electrode.

5. Apparatus for the melt casting of titanium and its alloys comprising a mold containing a melt of such material, a permanent electrode projecting into said mold, a consumable electrode of such metal to be cast projecting into said mold, means for maintaining an arc between said permanent electrode and said consumable electrode and an arc between said permanent electrode and the melt in said mold, means for forming said consumable electrode from pulverulent material and feeding the electrode thus formed comprising a tubular holder having a forming section of a ceramic material and a cooling and holding section of electrically conductive material, means for delivering successive increments of electrode forming material to the forming section of said holder, and means comprising a reciprocating punch actuated in synchronism with said material delivery means for compacting and partially sintering successive increments of electrode forming material delivered to said holder by said material delivery means.

6. Apparatus for the melt casting of titanium and its alloys comprising a mold for containing a melt of such material, a permanent electrode projecting into said mold, a consumable electrode of such substance to be cast projecting into said mold, means for maintaining an arc between said permanent electrode and said consumable electrode and an arc between said permanent electrode and the melt in said mold, means for feeding said consumable electrode as it is consumed, means for forming said consumable electrode from pulverulent material as it is fed, said electrode forming means comprising a tubular unit having as parts thereof a metallic electrode holder and a receptacle of insulating material adapted to receive electrode forming material, a punch arranged for reciprocation into contact with said electrode forming material, and an electrical circuit including said punch, said electrode forming material and said metallic holder.

7. The method for melt casting of titanium and its alloys comprising: continuously forming a rod-like electrode from pulverulent material containing titanium and feeding the same continuously in an electric furnace having a permanent electrode, at least partially sintering such electrode, connecting such electrode in a circuit of such electric furnace, and forming an arc from said permanent electrode to the melt in said furnace and to such consumable electrode.

8. The method for producing titanium and its alloys in an electric furnace having a permanent electrode which consists in continuously forming by compression a rod-like consumable electrode from pulverulent material containing such titanium and alloying substances therefor, simultaneously sintering said consumable electrode as it is so continuously formed, such sintering being effected by means of an electrical current which increases from a preselected low to a preselected high value in response to the degree of compression of such material, thereafter moving said sintered consumable electrode into arcing relationship with such permanent electrode and the melt in said furnace, and arcing such electrodes with one another and with the melt in said furnace.

9. The method for producing titanium in an electric furnace having a permanent electrode which consists in continuously forming by compression a rod-like consumable electrode from pulverulent material containing such titanium, subjecting that portion of said pulverulent material which is undergoing compression to a heating current sufficient to melt same into a solid substance, moving said sintered consumable electrode into arcing relationship with such permanent electrode, and arcing such electrodes with one another and with the melt in said furnace.

10. The method for producing titanium and its alloys in an electric furnace having a permanent electrode which consists in: placing one at a time in succession a plurality of increments of discrete particles of titanium and alloying substance in an open-ended tubular chamber; applying to each such increment progressively increasing pressure to compress same, simultaneously subjecting the particles undergoing such compression to a heating current sufficient to reduce the particles to a condition of plasticity wherein they will adhere to one another and each such increment will adhere to the one ahead thereof to form a continuous consumable electrode, said force simultaneously moving said particles undergoing compression and the consumable electrode axially along and out of said tubular chamber and into arcing relationship with the permanent electrode; and arcing such permanent electrode with the melt in said furnace and concurrently with such consumable electrode.

11. The method for producing titanium and its alloys in an electric furnace having a permanent electrode which consists in: continuously forming a rod-like consumable electrode by placing one at a time within an open-ended cylinder a plurality of increments of pulverulent material containing such titanium and alloying substances, applying progressively increasing pressure separately to each of such increments when so placed in the cylinder thereby to compress such material, simultaneous to such compressing applying an electrical heating current to the material undergoing compression sufficient to sinter same at least partially to form a solid consumable electrode, such heating current being increased from a preselected low to a preselected high value in response to the degree of compression of such material, such pressure urging such material axially of the cylinder simultaneous with the compressing and the heating thereof and moving such solid sintered consumable electrode into arcing relation with such permanent electrode; and arcing the latter electrode with the melt in said furnace and concurrently with such consumable electrode thereby to reduce the latter.

References Cited in the file of this patent

UNITED STATES PATENTS

| Number | Name | Date |
|---|---|---|
| 587,343 | Strong | Aug. 3, 1897 |
| 665,704 | Strong | Jan. 8, 1901 |
| 1,662,302 | Croese | Mar. 13, 1928 |
| 2,189,387 | Wissler | Feb. 6, 1940 |
| 2,193,434 | Sem | Mar. 12, 1940 |
| 2,303,973 | Armstrong | Dec. 1, 1942 |
| 2,338,936 | Hagerup-Larssen | Jan. 11, 1944 |
| 2,372,605 | Ross | Mar. 27, 1945 |
| 2,541,764 | Herres et al. | Feb. 13, 1951 |
| 2,564,337 | Maddes | Aug. 14, 1951 |
| 2,640,860 | Herres | June 2, 1953 |

OTHER REFERENCES

Parke et al.: Metals Technology Technical Publication No. 2052, v. 13, No. 6, September 1946 (12 pp.).